United States Patent [19]

Schoon

[11] Patent Number: 4,857,904

[45] Date of Patent: Aug. 15, 1989

[54] COMBINATION OF TRANSITION-ENCODED FONT INFORMATION FOR GENERATION OF SUPERIMPOSED FONT IMAGES

[75] Inventor: David J. Schoon, St. Paul, Minn.

[73] Assignee: Printware, Inc., St. Paul, Minn.

[21] Appl. No.: 96,959

[22] Filed: Sep. 15, 1987

[51] Int. Cl.⁴ .............................................. G09G 1/16
[52] U.S. Cl. .................................... 340/730; 340/703; 340/747; 340/790
[58] Field of Search ............... 340/730, 745, 735, 790, 340/721, 746, 729, 747, 703, 749

[56] References Cited

U.S. PATENT DOCUMENTS

| | | | |
|---|---|---|---|
| 3,109,166 | 10/1963 | Kronenberg et al. | 340/746 |
| 3,889,107 | 6/1975 | Sutherland | 340/729 |
| 3,944,997 | 3/1976 | Swallow | 340/717 |
| 4,384,338 | 5/1983 | Bennett | 340/729 |
| 4,408,198 | 10/1983 | Kudirka | 340/730 |
| 4,531,120 | 7/1985 | Brownell, Jr. et al. | 340/745 |
| 4,538,144 | 8/1985 | Yamagami | 340/729 |
| 4,603,330 | 7/1986 | Horne et al. | 340/745 |
| 4,616,336 | 10/1986 | Robertson et al. | 340/745 |
| 4,656,468 | 4/1987 | Takikawa et al. | 340/747 |

Primary Examiner—David K. Moore
Assistant Examiner—M. Fatahiyar
Attorney, Agent, or Firm—Dressler, Goldsmith

[57] ABSTRACT

Transition-encoded font image information is a form of information flagging all pixel displacement locations upon a scan line of a raster scan image generator, nominally a laser printer, whereat black to white, and white to black, transitions occur during generation of the one scan line of a font image. Transition-encoded information for plural, superimposed, font images may be combined prior to generation of a synthesis image. In this combination of transition-encoded information for generating superimposed font images the flags representing transitions must not be overwritten, there being a limit that a single scan line pixel position must either transit black to white, transit white to black, or maintain the state of the previous pixel. The combining of transition encoded information encodes transitions for these one or ones of addresses (pixels) wherein two flags would otherwise overlap so that the total transitions within the combined font information are preserved. This is accomplished by ripple shifting the position(s) of the transition(s) flag(s) within the second font image information which have identical positional correspondence with transition(s) flag(s) within the first font image information so that the flag(s) are slightly relocated within the combined font image information.

20 Claims, 5 Drawing Sheets

RIPPLE SEQUENCE WITHIN AN 8-BIT BYTE

COMBINATION OF TRANSITION-ENCODED FONT INFORMATION FOR GENERATION OF SUPERIMPOSED FONT IMAGES

REFERENCE TO RELATED PATENT APPLICATIONS

The present patent application is one of three patent applications by the same inventor filed on an even date and assigned to the same assignee. The present U.S. patent application for COMBINATION OF TRANSITION-ENCODED FONT INFORMATION FOR GENERATION OF SUPERIMPOSED FONT IMAGES teaches a manner of combining transition-encoded font information in order to simultaneously generate in an image generator, such as a laser printer, a plurality of superimposed font images. It is especially taught how to combine transition-encoded information for and at certain pixel points at which both transition-encoded font images (which are to be simultaneously generated) simultaneously undergo a white to black (or a black to white) transition.

Companion related U.S. patent application Ser. No. 07/096,961 for DECOMPRESSING RUN-LENGTH-ENCODED TO TRANSITION-ENCODED FONT IMAGE INFORMATION IN AN IMAGE GENERATOR teaches the use of conventional, run-length-encoded, font image information to generate, by a process called decompression, a corresponding new type of information called transition-encoded information. This transition-encoded information represents every black-to-white, and every white-to-black, transition, and the pixel locations of each of these transitions, which are undergone by selective pixels upon a single scan line during the generation of a font image as the synthesis product of many successive scan lines. It is this transition-encoded information which is combined and then used for superimposed font image generation in accordance with the present invention.

Finally, companion U.S. patent application Ser. No. 07/096,960 for IMAGE GENERATION FROM TRANSITION-ENCODED FONT INFORMATION teaches the general use of this particular new type of transition-encoded information—which information regards the transitions, and the pixel locations of transitions, from both white to black, and from black to white, which are undergone along and upon a scan line—in order to generate a font image.

The three related patent applications are collectively concerned with the generation, use, and special combining for use, of a particular new form of encoded font image information—transition-encoded font image information—in and by an image generator device, nominally a printer. The contents of the aforementioned companion patent applications are incorporated herein by reference.

BACKGROUND OF THE INVENTION

1. Field of the Invention

The present invention generally relates to image generation hardware, particularly including printers and most particularly including non-impact printers. The present invention is concerned with the use of a particular new form of encoded information—transition-encoded font image information—in the generation of a font image, and more particularly in the generation of superimposed font images. The manner by which this new information is generated will be explained somewhat simplistically in the present specification. A more sophisticated teaching of the preferred manner of the generation of this transition-encoded font image information is particularly taught in the aforementioned companion patent application Ser. No. 07/096,961. However, for purposes of understanding the present invention it is only necessary to simplistically understand the nature of transition-encoded information in order that it may be further understood how such information is used in the generation of images, and in the generation of superimposed font images.

2. Description of the Prior Art

An image generator is a device which receives information, nominally in ASCII form, from a computer, a computer terminal, or other such device. The image generator interprets such information in order to effect a pixel by pixel monochrome or color control of a marking device. For example, an image generator may be within a printer. For example, the pixel by pixel monochrome control may be effected by an on/off control of a raster-scanned marking device such as a laser light beam.

During the course of image generation, the image generator, nominally a printer, needs to, and will, transform, or "decompress", certain high-level encoding, such as the ASCII encoding, representing the characters and the character fonts to be imaged (printed), into the more detailed notational encodings which represent the actual font images of each character to be printed. The actual font image information may be represented by bit map (raster scan) data, run length encoded raster scan data, or by outline format (similar to pen plotter format) data. These detailed encodings are the information which is actually used, in real time, to control the marking device of the image generator. For example, a certain single ASCII encoding always represents an "a". The image generator will transform this ASCII "a" into an image represented in a certain font; for example, a block "a" or an italic "a" or an inverse color "a" or literally thousands of particular ways of generating the font image of an "a" (all of which font images are recognizable to the human brain as an "a"). Each of these different images, although all are "a", has an associated detail encoding, unique from all other detail encodings.

A commonly used prior art form of such detailed encodings is bit-map encoding. A grid matrix of the image area is created. Within this grid area the presence, or absence, of a marking at each intersection of the grid in a formation of an image of a particular character of a particular font is represented by the presence, or absence, of a binary bit within a data store, or map, for that particular character and font.

The transformation, or decompression, of information encondings involved in bit-mapped image generation normally transpires as follows. When the device controlling an image generation inputs a character, for example, the ASCII encoded letter "a", then the image generator determines from internally stored information what some particular certain image of an "a" looks like in some particular font. Usually there is a pixel map stored in the image generator memory which "maps out" those pixels for which the marking device will be caused to be "on" and those for which it will be caused to be "off" during the generation of a particular font image for a particular character, thereby generating the desired white and black image of the character. The user normally additionally specifies a font type, font size, and various other information in order to select amongst many alternative ways of representing the same character, for example the small letter "a" as printed in many fonts (Roman, Italic, etc.) at many sizes, slants, boldness levels, etc.

Depending on the resolution, a substantial amount of memory space can be tied up in the bit mapped specification of each font. For example, if the resolution of 300×300 dots (or pixels) per inch (dpi), then a 12 point character (1/6" high) requires 1500 bits (30×50) of information. If the resolution is 1200×1200 dpi, then 24K bits of information are required. For one complete font alphabet of 128 characters, over 3 Megabits of information are required for the bit-mapped image representations of these 128 characters. Typically it is desired to have many fonts available simultaneously. The present industry trend is towards higher resolution and more fonts. This often results in memory requirements which are difficult, if not totally impractical. Some prior art image generation systems use hard discs for bit-mapped font image information storage. However, these systems run slower than certain prior art systems which store bit-mapped font image information in semiconductor random access memory (RAM) because of the longer access time of disk memory as compared to semiconductor RAM.

It is also known in the prior art to store font image information either in Programmable Read Only Memory (PROM), or on a disk, in a compressed mode. However, this compressed font image information is always fully "blown up" into full bit-mapped data in RAM. This bit-mapped information means that one bit of storage is required for each pixel of information on the page. In some image generators, the page to be printed is assembled on a pixel by pixel basis before it is printed. This is referred to as a "full bit map" system. It is quite flexible but the cost is high.

A second problem with bit-mapped image generation systems occurs because of the trend towards higher densities and more fonts. It is currently desired to place characters at any position within an image area (on the page)—including in overlapped positions—without regard to where any other character might be placed. One way of doing this is to have a very fast and very capable microprocessor system place the information for each character in a large RAM. However, this adversely takes a lot of processing time while the printer engine sits idle and while the programmer sits impatiently as this information is being assembled.

The present invention is particularly concerned with the use of a new form of "transition-encoded" information in image generation, and more particularly in the generation of superimposed images. The related patent application s/n 07/096,961 shows that the new form "transition-encoded" information is derived by transforming, in and by a new process called "decompression", certain conventional run-length-encoded font image information. Both the run-length-encoded information which is "decompressed", and the "transition-encoded" information into which it is "decompressed", represent the images of characters and of character fonts which are generatable by an image generator. The reason that this transformation, or "decompression", which is the subject of the related invention is performed is because run-length-encoded information is not directly usable to control the marker of an image generator. However, the new form transitionencoded font information into which the run-length-encoded information is efficiently transformed will be shown by this disclosure to be highly effective for controlling a marker, in real time, to actually generate images and particularly superimposed images of character fonts.

As background particularly pertinent to the present invention, it should be recognized that there is nothing intrinsic about transition-encoded font image information which makes that it should not be thought to be generally susceptible of combination. It appears from the nature of transition-encoded information that the separate data representing a one font image should be combineable with other separate data representing a second font image in order to produce composite data, equal in bit length to either the first or the second font image data, which represents the superimposed font images. It is generally conceivable that an image generator should combine the transition-encoded image data of all images which are to be generated in full or partial superposition prior to generating, at a single time and in one only imagegenerating operation, the totality of the image(s) to be generated.

However, a special problem, addressed by the present invention, presents itself upon any attempted symplistic combination, such as by a logic ORing, of separate transition-encoded font image data records. Mainly, each transition-encoded data record records all pixel points during the generation of the associated font image whereat the image-generating marker transitions from black to white, or from white to black. If two transition-encoded font image data records being combined have, by happenstance, a same transition at a same pixel then the record of one transition will be lost if the combined information is to simplistically show one only transition at that pixel. A more sophisticated approach to the combination of transition-encoded data for the generation of superimposed font images is required. The present invention particularly deals with such a sophisticated method and apparatus for combining transition-encoded font image data so that no transitions are lost, and so that all transitions within the separate images are preserved, in generation of the combined, superimposed, image.

SUMMARY OF THE INVENTION

1. The Environment of the Present Invention, and its Relationship to Certain Other Inventions Within Related Patent Applications The present invention is embodied in an image generating system, nominally a printer, which uses a particular new format of information in the generation of visually discernible font images and superimposed font images. This new format of information useful in image generation is called transition-encoded information. It is derived by a transformation, or decompression, of run-length-encoded information concerning font images.

The image generating system in accordance with the present invention is conventionally commanded by a computer or the like. The system is commanded as to which particular character at which particular font (at which particular size, slant, density, etc.) should have its associated run-length-encoded font image information decompressed in order that, responsively to this decompressed information, the image generator should generate the appropriate font image of the appropriate character. The image generating system is also commanded as to where within the image area the font character image should be placed. Multiple font images may be commanded by the computer to be generated in an overlapping area or areas, in which case the font images are partially or totally superimposed in any manner whatsoever and without restriction on the types of fonts or the locations of their superpositions.

When so desired to generate a particular one of large number of characters at a particular one of a large number of fonts, the image generating system will decompress certain appropriate run-length-encoded information in order to produce, at one time, only so much transition-encoded information as controls the generation of a one font image upon a one scan line. All font images, including superimposed font images, which are upon this one scan line are generated at one time. This means that if more than one font image is to be simultaneously generated in superposition, then additional run-length-encoded information will be decompressed to transition-encoded information. These decompressions will be continued for as many times as there are superimposed font images to be generated. (These multiple decompressions are routinely accomplished, but it is the separate transition-encoded font image information developed therefrom which must be combined in accordance with the present invention.)

Subsequent decompressions of still further run-lengthencoded information permit the generation of subsequent scan lines, and ultimately permit the generation of the entire image of all fonts, including superimposed fonts. Thus the transition-encoded font information is transitory within the ongoing operation of the image generating system. Therefore, it might alternatively be considered that the system is for for the real-time generation of raster scanned images immediately, but indirectly, from run-length-encoded information without the necessity of forming bit maps (from any information source). Instead of these bit maps, the marker of the image generating system will be controlled in generation of the image by an intermediary form of information called transition-encoded information.

2. Summary of a First Related Invention Usefully Understood for Understanding the Present Invention The present invention concerns the combination of transition-encoded information in order to generate to superimposed font images. The manner as to how the transition-encoded information used for image generation by the present invention is derived, basically from run-length-encoded information, is discussed in the present specification, but the most extensive discussion of the derivation of transition-encoded font information is within the priorly-identified companion, related, patent application Ser. No. 07/096,961. Suspending for the moment the subject of the present invention as to how transition-encoded font information is preferably combined in order to generate superimposed font images, a summary of a first related patent application regarding the derivation of transition-encoded information is given in the following five paragraphs in order that the nature of that particular, transition-encoded, information upon which the present invention (hereinafter summarized in the following section 4.) operates may be better perceived.

U.S. patent application Ser. No. 07/096,961 teaches what transition-encoded information is (by definition), and how transition-encoded information is derived by transformation, or decompression, of run-length-encoded information. Runlength-encoded font images information does not use one piece of information for every pixel in the font image, but rather uses one piece of information for every transition. In this aspect it is quite different from bit-mapped information (into which it is often converted in the prior art) and is actually more similar to the transition-encoded information into which it is converted.

Run-length-encoded font information contains the incremental distance between white/black transitions in the font image. For example, for a given character in a given font, the information might be interpreted as (1) there are 11 pixels from the left margin of the character box to the first transition, which is white to black; (2) then there are 22 additional pixels of black, (3) then 13 more pixels of white, (4) then 8 more pixels of black, and (5) that is the end of that character. It is common practice to store font information in PROM or on disk in such a run-length-encoded form. Usually the amount of information required is smaller than that required otherwise, especially when the resolution is very high. Run-length-encoded information may fairly be described as "compressed".

Image generation cannot transpire directly from this compressed run-length-encoded information. However, transition-encoded information may be quickly and efficiently produced from run-length-encoded information, and this transition-encoded information may then be used for image generation. This production is called "decompression" because the transition-encoded information occupies more memory, albeit for but a short and temporary time during the generation of one scan line, than the run-length encoded information from which it is derived.

The decompression of run-length-encoded information into transition-encoded information is done quickly and efficiently in a hardware system which runs "automatically" once a small amount of initial information has been supplied to it. Particularly, the hardware decompression system receives (i) the vertical position, (ii) the horizontal position, and (iii) a starting address in a font memory whereat a run-length-encoded description of a particular character font is stored (which image line is, in rudimentary form, a single line of print). The decompression system develops the transition-encoded information for a one scan line, of which scan lines a font image will normally contain many, at one time.

The transition-encoded information for each scan line is basically developed by adding, in an adder, the initial horizontal displacement address plus, in a cumulative fashion, the run-length-encoded font information for each character which appears, in a portion of such character, upon that scan line. The vertical position information is used to identify which characters within an image line may have portions within a particular one scan line of such image line. For example, the lower case character "a" may be generated using only roughly the lower half of these total scan lines which combinatorially generate a single image, or "print", line capable of showing both upper and lower case characters. Finally, certain counts, holding registers, and control codes make certain that the decompression of run-length-encoded data in order to generate successive scan lines of transition-encoded data is properly sequenced.

3. Summary of a Second Related Invention Usefully Understood for Understanding the Present Invention As previously stated, the present invention concerns the combination of transition-encoded information in order to generate to generate superimposed font images. The manner as to how the transition-encoded information is used for image generation is discussed in the present specification, but the most extensive discussion of the use of transition-encoded font information in image generation is within the priorly-identified companion, related, patent application Ser. No. 07/096,960. Suspending for the moment the subject of the present invention as to how transition-encoded font information is preferably combined in order to generate superimposed font images, a summary of this second related patent application regarding the use of transition-encoded information in image generation is given in the following two paragraphs in order that a derivative, expanded, use of such particular, transition-encoded, information within the present invention (hereinafter summarized in the next section 4.) may be better understood.

The related patent application Ser. No. 07/096,960 concerns how transition-encoded information (once derived) may (then) be used to effect control of an image system marker, for example, a laser beam, which is generating an image. The transition-encoded information is preferably emplaced in two parallel random access memories (RAMs). (The preference for two RAMs, as opposed to one which would be adequate to hold transition-encoded information, is hereinafter discussed.) For example, consider each RAM as 16K×1. When there are less than 16K pixels in one scan line then there is one-to-one correspondence between pixels upon the scan line and addressable memory cells within each RAM. Envision each RAM as initially containing all 1's. Now in the first RAM, a flag, say a "0", is stored at the point of every transition upon the scan line from white to black. And, in the second RAM, a flag, say a "0" again, is stored at the point of every transition upon the scan line from back to white. These flags, and the addresses at which they are stored, constitute transition-encoded information. This transition-encoded information can be recorded in any order. The number of bits which are changed is equal to the number of transitions in the scan line (a number which is far less than the number of pixels). The process of making and recording this information is the process taught within the related patent application, and occurs independently of the image generation process.

During the generation (e.g., the printing) of a scan line both RAMs are simultaneously read. An address counter supplies the address for both RAMs, and this counter counts sequentially at the pixel clock rate. Every time the first RAM outputs a zero, a counter is counted in a particular direction, nominally incremented. Every time the second RAM outputs a zero, the same counter is counted in the opposite direction, nominally decremented. The positive or the negative count of the counter is used to control the black, or the white, generation of successive pixels upon the scan line. For example, a positive count or a negative count within the counter may respectively control a laser beam to be "on" or "off", respectively generating white and black pixels in a positive image-generating system such as a video display unit, or respectively generating black and white pixels in a negative image-generating system such as electrostatic printer wherein the laser beam discharges selected areas of a photoconductive surface.

4. Summary of the Present Invention

The present invention concerns the combination of transition-encoded data and the use of the combined data for the generation of overlapping, superimposed, font images. The present invention resides in an image generating apparatus producing a scan line which is controlled to be white or black responsively to transition-encoded information within a memory. The apparatus and method of the present invention, according that the transition-encoded information of two font images may be combined, reads transition-encoded first font image information in blocks, nominally of eight bits each, from the memory within which such information is stored. The same encoding means are then employed to produce transition-encoded information for a second font image as were previously and conventionally (in accordance with the first related invention) used to generate the transition-encoded information for the first font image (the information which is within the memory, and which was read therefrom in blocks).

In accordance with the present invention there then, further, transpires a combining in special, custom logic, combining means of the block of transition-encoded information for the first font image with the corresponding block of the transition-encoded information for the second font image. The combining of the information transpires by blocks and produces equally sized blocks (nominally eight bits each) of combined font image information. When all transition-encoded information has been combined by blocks then this combined information will serve, in the image generator, to enable the generation of superimposed images.

A crux of the present invention therefore concerns this combining. The combining particularly must deal with those one or ones of the plurality of addresses, corresponding to pixels, wherein transitions are encoded in the information for both the first and the second font images (if any such addresses exists). The combining will encode transitions for these one or ones of addresses (pixels) so that the total transitions within the combined font information are preserved. This is preferably accomplished by shifting the position(s) of all such transition(s) within the second font image information which have identical positional correspondence with transition(s) within the first font image information to be slightly relocated within the combined font image information. This relocation, or shifting, is done in a predetermined ripple sequence only to such extent, and to such displacements, as is (are) necessary. This shifting for combining is preferably performed in a custom logic structure which is preferably formed from AND and OR gates. Finally, the combined font information is restored to the memory.

5. Collective Objects of the Related Inventions

It is one object of the collective inventions within the three related patent applications to achieve full bit-mapped performance, but at a cost and complexity far below that of a full bit mapped system. Still further, it is the objective of the three inventions to improve the processing speed over that speed otherwise available except at very high cost. This cost performance improvement is obtained because the image generator hardware system will perform "intelligent" operations which might usually be associated with the capabilities of, and operations performed by, a microprocessor. (These "intelligent" operations include the generation of superimposed font images in accordance with the present invention.)

6. Particular Objects of the Present Invention

It is one particular object of the individual present invention to efficiently and quickly combine a new, non-bitmapped, format of information called transition-encoded font information to permit the generation of superimposed font images by an image generator. The combining will be sufficiently efficient and quick when implemented with commonly available integrated circuit components so as to allow imaging (printing) on the order of 8 pages per minute (PPM) at 600 dots per inch (DPI) vertical resolution and 1200 DPI horizontal resolution, or 2 PPM at 2400 DPI vertical resolution and 1200 DPI horizontal resolution.

It is the further particular object of the individual present invention that the efficient and quick combining of transition-encoded font information used for superimposed image generation is without any substantial limitations upon the images which can be superimposed and the resultant numbers of transitions which can occur within a single scan line, every pixel permitting of a transition should the display of superimposed font images so require. Since there is no substantial limit on the flexibility of the display of superimposed font images, similarly to bit-mapped encoding of pixel black/white state, then great numbers and types of display images—including logos, signatures, bar codes, pictographs and pictures as well as alphanumeric characters—may be displayed and superimposed to any desired degree on demand at sizes from 4 to 255 points. Speed and flexibility of superimposed imaging within the present invention is limited mostly by the circuitry which creates the transition-encoded information (which circuitry is desribed in a related patent application). The flexibility of superimposed imaging is limited only in extreme cases—basically wherein great numbers of densely transitioning images are attempted to be combined—by that combination of transition-encoded information transpiring in accordance with the present invention.

DESCRIPTION OF THE PREFERRED EMBODIMENT

The present invention resides within an image generator, or processor, which is nominally used as an intelligent controller for a non-impact, laser, printer. The image generator, and present invention, can be used for generating images which are not printed, such as those appearing on a video display unit. The image generator uses real-time raster scan techniques in accordance with the present invention and related inventions to create typeset quality images of 1200 horizontal × 1200 vertical dots per inch (DPI) at the rate of four 8½"×11" pages per minute (PPM). At such resolution and speeds the image generator must supply pixel by pixel information to turn the image marker—a laser beam—"on" and "off" at speeds up to 35 MHz. The present invention and related inventions allow accomplishment of this high speed control without requiring those very large amounts of high speed, and expensive, memory which would be required by prior art full bit mapped raster scan techniques.

Some rationale for the approach by the present invention and related inventions is as follows. As discussed in the Background of the Invention section, a bit-mapped representation of an entire image line uses considerable amounts of high speed and expensive random access memory (RAM). An image line is of variable height dependent upon the type of font and the font height (from 4 to 255 prints) being represented, and is nominally 8.6 inches in width. An image line is normally comprised of a large number of horizontal scan lines. Thus it might be investigated if RAM requirements could be reduced by bit-mapping at the scan line, as opposed to the image line, level. For the 8.6" wide image area, and at 1200 dpi, there are 10,320 pixels in each scan line. A straightforward approach would be to try to prepare a bit-mapped RAM storage wherein each address is one pixel and wherein a stored "1" represents black while a stored "0" represents white. This turns out to be a brute force approach to producing the information needed to control the pixel by pixel, black and white, generation upon a scan line. Moreover, at high pixel rates of scan line generation there is insufficient time, at least when using common integrated circuit semiconductor components, to prepare an approximate 10,320 addresses of bit-mapped RAM storage during an approximate 1100 microsecond generation of each scan line. The present invention and related inventions use an alternative approach to the prior art bit-mapped control of pixel generation.

Figures 1, 2:
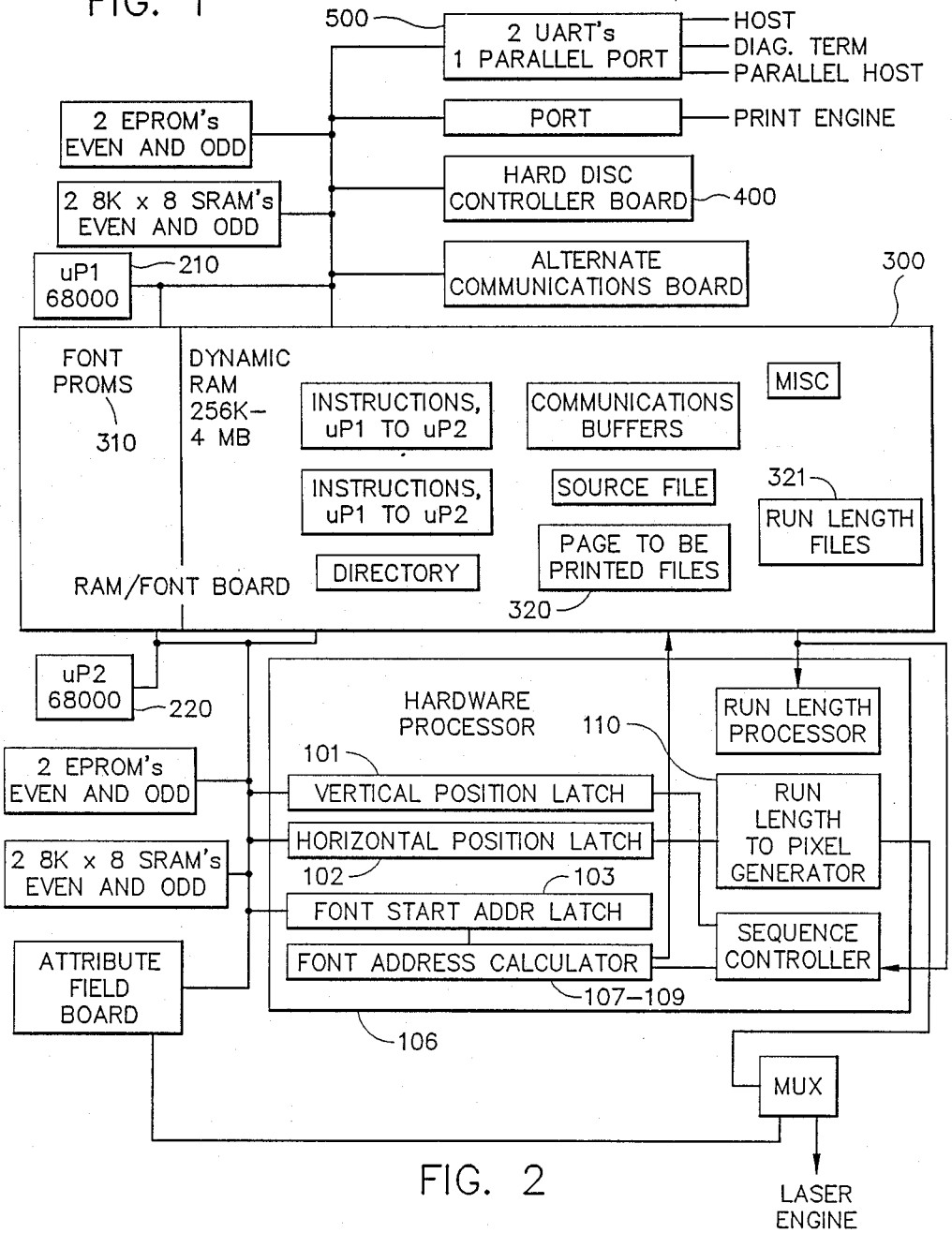
FIG. 1 is a representation showing the control of an image system marker by transition-encoded information.
FIG. 2 is a block diagram showing an image processing system including an image generator hardware processor wherein the present invention resides.

In this alternative approach a memory space of 16,384 pixels (10,320, plus unused extras) is mapped out twice; once for white-to-black transition points, and a second time for black-to-white transition points. The representation of this mapping is shown in FIG. 1. Although one physical RAM could be mapped two tiwes—once with a first-type flag at white-to-black transition points and again with a second-type flag at black-to-white transition points—it has been found that the use of two parallel RAMs is advantageous. The black-to-white transitions are recorded in a nominal first random access memory RAM1, and the white-to-black transitions are recorded in random access memory RAM2. Within FIG. 1 the left-to-right extension of the lines at RAM1 and RAM2 represent the memory addresses (10,320+) of each random access memory while the vertical "tick marks" represent the relative locations within each random access memory whereat the flags are stored.

Observing FIG. 1, the convention is employed that each RAM is initially written to all 1's, (shown as a high level) and each transition indicated by a "0" (shown as a low-going spike). It may immediately be recognized that information is not required to be written into the RAMs for every pixel. All that is necessary is to determine whether each transition within run-length-encoded font information represents black-to-white or white-to-black, and to insert that information into the proper address of the proper one of each of two initialized RAMs. The information about transitions which is inserted into random access memory at certain addresses, corresponding to pixels, at which such transitions occur is called transition-encoded information.

In the approach to image generation of the present and related inventions, the transition-encoded information within the two RAMs—RAM1 and RAM2—will be read simultaneously sequentially during the printing of each scan line. The reading will start when the start of scan (SOS) signal from the marker system, e.g. from a laser scanner, indicates the beginning of a scan line.

An address counter supplies the address for both RAMs, and this counter counts sequentially at the pixel clock rate. The control of the marker responsive to the example flags stored in RAM1 and RAM2 is illustrative as line BLACK/WHITE shown in FIG. 1.

A block diagram generally showing the hardware environment—a complete image generator—of a preferred embodiment of a system within which the present invention resides is shown in FIG. 2. This preferred system embodiment is particularly for use in a laser printer, and within such a system the HARDWARE PROCESSOR shown in Figure 2 is the particular location of the present invention. The entire image generator block diagrammed in FIG. 2 converts ASCII character information into pixel by pixel control of a raster scanning laser printer. The image generator is managed by two microprocessors, nominally including a first microprocessor uP1 210 type 68000 controlling external communications to and from a computer or the like, handshakes with the printer engine, and the placing of data within the font memory RAM/FONT BOARD 300. A second microprocessor uP2 220 type 68000 interacts with the same font memory RAM/FONT BOARD 300 to move certain initial data to the HARDWARE PROCESSOR 100 in response to a print command. This certain data is in the nature of the vertical and horizontal position at which printing is to transpire and the first address of a font which is to be printed from the location of this upper left-hand corner pixel. The second microprocessor uP2 does not do the decompression of run-length-encoded data into the transition-encoded data which is used to control the black/white transitions of the print engine. Rather, it just "kicks off" each font which is to be printed, and where (including in overlapping and superimposed position) the font is to be so printed. Then the HARDWARE PROCESSOR in accordance with the present invention will attend to all necessary control of the laser marker of the printer.

The exact sequence of "feeding" run-length-encoded font information, and positional information, to the HARDWARE PROCESSOR 100 could be accomplished in diverse ways. One way is to store a most condensed run-length-encoded form of font information in the FONT PROMS 310 part of the RAM/FONT BOARD 300, or, alternatively and additionally, upon a hard disk which is accessed through HARD DISK CONTROLLER BOARD 400. In accordance with the font size, or scaling, received from the computer HOST via the 2 UARTS, 1 PARALLEL PORT 500 the first microprocessor uP1 210 expands the run-lengthencoded information (still as run-length-encoded information, now scaled) and emplaces it in the dynamic RAM of the SOURCE FILE, part of the RAM within the RAM/FONT BOARD 300. The first microprocessor uP1 in response to input commands also assembles a complete PAGE TO BE PRINTED FILES 320, part of the RAM/FONT BOARD 300 which contains a page image entirely in (appropriately scaled) run-lengthencoded information. This is a modest amount of work, but a large and highly time constrained task remains in controlling the black/white state of the print engine marker to image this information during high speed scan lines of approximately 10,320 pixels each during a scan time period of approximately 1100 microseconds. This task is initiated by the second microprocessor uP2 220 which reads the PAGE TO BE PRINTED FILE 320 and, responsively thereto, places information regarding which character and which font (i.e., what starting address within the FONT PROMS 310), horizontal position, and vertical position within the HARDWARE PROCESSOR 100. The HARDWRAE PROCESOR 100 takes this initial information, basically in the nature of commands or directives, and uses it to extract appropriate compressed font run-length-encoded information from the dynamic RAM of the PAGE TO BE PRINTED FILE 320, and to assemble the "on" and "off" transition addresses of the transition-encoded information. From this transition-encoded information the RUN LENGTH TO PIXEL GENERATOR 110 will control the LASER of the print ENGINE to turn "on" and "off", producing respective white and black imagery "on the fly".

Figure 3A:
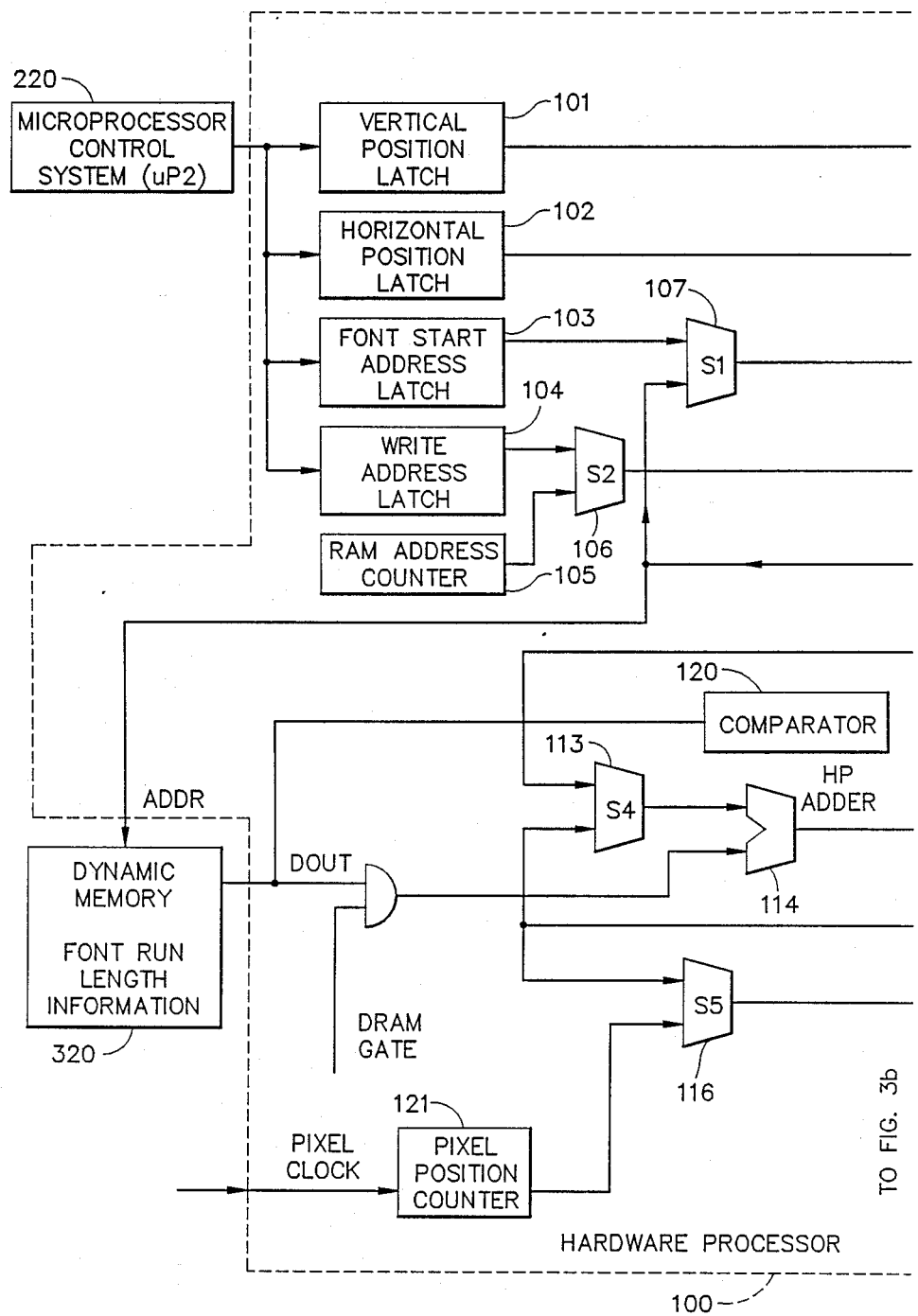
FIGS. 3a and 3b are hardware diagrams showing the image generator hardware processor, previously seen in FIG. 2, wherein the present invention for the combining of transition-encoded font information in generation of superimposed font images resides.
Figure 3B:
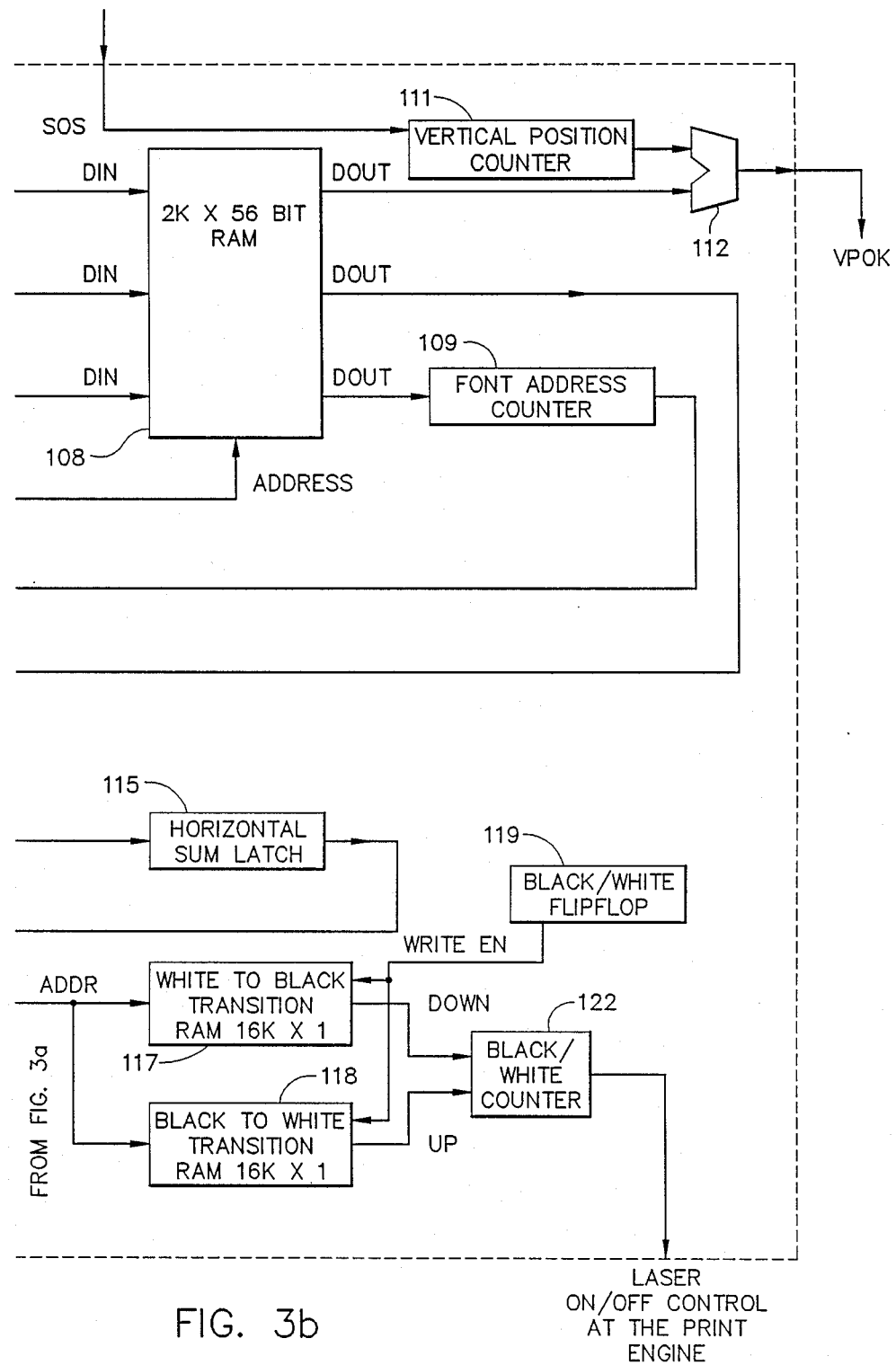

A hardware block diagram of a preferred embodiment of a HARDWARE PROCESSOR 100 (previously seen in FIG. 2) for decompressing, or transforming, run-length-encoded information into transition-encoded information and for using this transition-encoded information to generate each scan line of a font image, is shown in FIG. 3. The MICROPROCESSOR CONTROL SYSTEM uP2 220 loads information for vertical position (16 bits), horizontal position (16 bits) and font start address (24 bits), respectively into the VERTICAL POSITION LATCH 101, the HORIZONTAL POSITION LATCH 102, and the FONT START ADDRESS LATCH 103. It then picks an address location which is known to be available, and loads that information in the WRITE ADDRESS LATCH 104. A automatic sequence causes the aforementioned 56 bits of information to be loaded into one address of the 2K x 56 BIT RAM 108. During this process, selector S2 106 is set to convey information from the WRITE ADDRESS LATCH 104 to the address input of the 2K×56 BIT RAM 108. At all other times selector S2 106 is set to convey the RAM ADDRESS COUNTER 105 information to the 2K×56 BIT RAM 108 address input. Moreover, during this time selector S1 107 is set to convey information from the FONT START ADDRESS LATCH 103 to the 2K×56 BIT RAM 108. Writing to this RAM 108 occurs by cycle stealing, i.e. all other processes which might be operating are interrupted for one clock cycle in order to permit writing information into this RAM 108.

The information that has been loaded into the RAM 108 is the (x, y) position on the page whereat an upper left corner of a font is to be generated, together with the address, in the DYNAMIC MEMORY 320,321, of where that particular font begins to be described in (previously appropriately scaled) run-length-encoded information. The DYNAMIC MEMORY/FONT RUN LENGTH INFORMATION 320,321 was previously called the PAGE TO BE PRINTED FILES 320, and the RUN LENGTH FILES 321, in FIG. 2.

Once for every scan line in a raster scanned image generating system, the RAM ADDRESS COUNTER 105 is caused to sequence through all addresses of the 2K×56 BIT RAM 108, which will permit the processing of every character's information which is resident there. Up to 2K characters which have some part of such character falling anywhere upon a given scan line may thus be represented. Normally the number of characters which might fall on a given scan line is less than 1/10 of 2K, and may typically be as few as the number of alphanumeric characters which are typically within a single print line. Immediately, however, it is obvious that the decompression and the resultant image generation in accordance with the present invention is well able to take in stride very numerous and correspondingly narrow (less than an average of 6 dots wide at 1200 dpi) characters or, as is more commonly the case, overlapped and multiply overlapped and densely multiply overlapped characters.

Once for every sweep of a scan line, a SOS (start of scan) signal is generated. In a laser print engine scanning a laser beam by an oscillating or by a rotating mirror, this SOS signal might typically be generated responsively to the mirror position. This SOS signal causes the VERTICAL POSITION COUNTER 111 to increment. The COUNTER 111 refers to the current vertical position on a page of the scanning beam. The vertical position of a given character to be potentially printed (for which certain information is contained within the RAM 108) is, during each scan cycle when all information is checked, compared with the VERTICAL POSITION COUNTER 111 in comparator 112. If the vertical position on the page whereat a character is to be printed is advanced further down the page than that position where the scanning beam currently is, then the VPOK (for Vertical Position OK) signal is taken by the control system to inhibit any action for that character or RAM position.

Once the VPOK signal indicates, for a given character, that that character's vertical position is at or in arrears of the current vertical position of the scanning beam, then the control system causes information for that character to be processed. The information is processed in the following three steps, or cycles, plus a fourth step if an end code is seen.

In a first step, the 2K×56 BIT RAM 108 is read, causing the FONT ADDRESS COUNTER 109 to be loaded with a font address. Moreover, selector S4 113 conveys the horizontal position information from RAM 108 to the HP ADDER 114. The DRAM GATE signal is low, so that this gated horizontal position information is added to zero, and is then stored unchanged in the HORIZONTAL SUM LATCH 115.

In a second step the FONT ADDRESS COUNTER 109 provides address information to the DYNAMIC MEMORY 320, which contains run-length-encoded font information. The resulting Dout (data out) read from the DYNAMIC MEMORY 320 is gated to the HP ADDER 14, with the DRAM GATE signal being now high. At this time selector S4 113 acts to convey information from the output of the HORIZONTAL SUM LATCH 115 to the upper input of this HP ADDER 114. This makes that at the conclusion of the step, or cycle, when the output of the HP ADDER 114 is latched, then the HORIZONAL SUM LATCH 115 will contain the sum of the original horizontal position (obtained from the 2K×56 BIT RAM 108) and the offset to the first transition (obtained from the DYNAMIC MEMORY 320). When this information is valid, then selector S5 116 will act to gate this information as signal ADDR to select an address in each of the two transition memories, namely the WHITE TO BLACK TRANSITION 16K×1 117, and the BLACK TO WHITE TRANSITION 16K×1 118. The BLACK/WHITE FLIPFLOP 119 is initialized to a state which permits this address information to be relevant to and used by the WHITE TO BLACK TRANSITION 16×1 117, but not to or by the BLACK TO WHITE TRANSITION 16K×1 118. A single-bit "transition occurs here" record is then stored in the former of the two RAMs 117,118. This record, or flag, is the beginning assembly of transition-encoded information. At the conclusion of this second cycle, the FONT ADDRESS COUNTER 109 is incremented.

The next, third, step or cycle is quite similar to the second step above, except for the following two occurrences. First, the BLACK/WHITE FLIP-FLOP 119 is now toggled so as to make the BLACK TO WHITE TRANSITION 16K×1 118 record the information which is generated, instead of the WHITE TO BLACK TRANSITION 16K×1 117. Second, the HORIZONTAL SUM LATCH 115 records the sum of the previous information, plus whatever offset is presented from the DYNAMIC MEMORY 320.

At the conclusion of this third step, the COMPARATOR 120 checks the most significant bit (which is not used by the HP ADDER 114 when the BLACK/WHITE FLIP-FLOP 119 is set for black/white transitions), and if that bit is high, this transition is considered to be the end of the character. If this is not the case, additional steps, or cycles, equivalent to steps two and three are repeated until such an end code is seen.

If such an end code is seen, then the following fourth step, or cycle, is then executed. The font contents of the FONT ADDRESS COUNTER 109 are written back into the 2K×56 BIT RAM 108 (with the selector S1 107 controlled to convey such information). Thus for the next scan line, the new font address information will start where the old font address information left off.

After steps one through four have been completed for a given character, then the RAM ADDR COUNTER 109 is incremented, and these four steps are repeated for each successive character until all of the potentially up to 2K characters which are potentially upon a single scan line have been processed. This processing has completely converted run-length-encoded information into transitionencoded information for a single scan line of the image generator.

The foregoing decompression, or conversion, or processing has served to record in the WHITE TO BLACK TRANSITION 16K×1 117, and in the BLACK TO WHITE TRANSITION 16K×1 118, the locations of the respective white-to-black and black-to-white transitions along a given scan line. Once this information has been recorded, then selector S5 116 is set to select the PIXEL POSITION COUNTER 121 to sequence through the memory locations of RAMs 117,118 in parallel, and to read the transition-encoded information stored therein. This information is read in parallel to the BLACK/WHITE COUNTER 122, and used to count down and/or count up this COUNTER 122. In the count so obtained, the most significant bit, or sign bit, is used to modulate the marker of the scanning system, or the LASER ON/OFF CONTROL AT THE PRINT ENGINE. The signal PIXEL CLOCK which feeds the PIXEL POSITION COUNTER 121 is a clock which completes one cycle for each and every advancement of the scanning beam by one horizontal pixel in distance. This COUNTER 121 is reset at the beginning of each scan line.

The COMPARATOR 120, when sensing information from the DYNAMIC MEMORY 320, also checks for a unique code (nominally "FF") which, when seen, indicates the end of the run-length-encoded information for the entire character font. When this code is seen, then the contents of the FONT ADDRESS COUNTER 109 are changed to represent an address out of range, which address is then recorded by the 2K×56 BIT RAM 108. When this same location in RAM 108 is next interrogated, then the control system interfacing with the HARDWARE PROCESSOR will check not only for VPOK (mentioned above), but also for a font address (as supplied to DYNAMIC MEMORY 320) which is within a permissible range. If this is permissible font address is not seen, then (further) image generation in response to that character is skipped. Thus characters may be skipped, or suspended from being actively used to control image generation, either because (1) their vertical position places them in a "waiting" status, or (2) their font address indicates that that character has been completely processed.

It should be noted that there are two types of stop codes for each font character. The first code suspends the reading of information for a given scan line, to be resumed on the next scan line. This code is a high, most significant, bit on the black duration information bytes (not being continuation bytes). The second code, as mentioned above, suspends information about the entire character.

Because of this detection of font addresses out of range, the second microprocessor uP2 220 (shown in FIG. 2) knows which locations in the 2K×56 BIT RAM 108 will have information which is no longer required, and thus information for new characters to be subsequently printed may be loaded in those locations.

Figure 4:
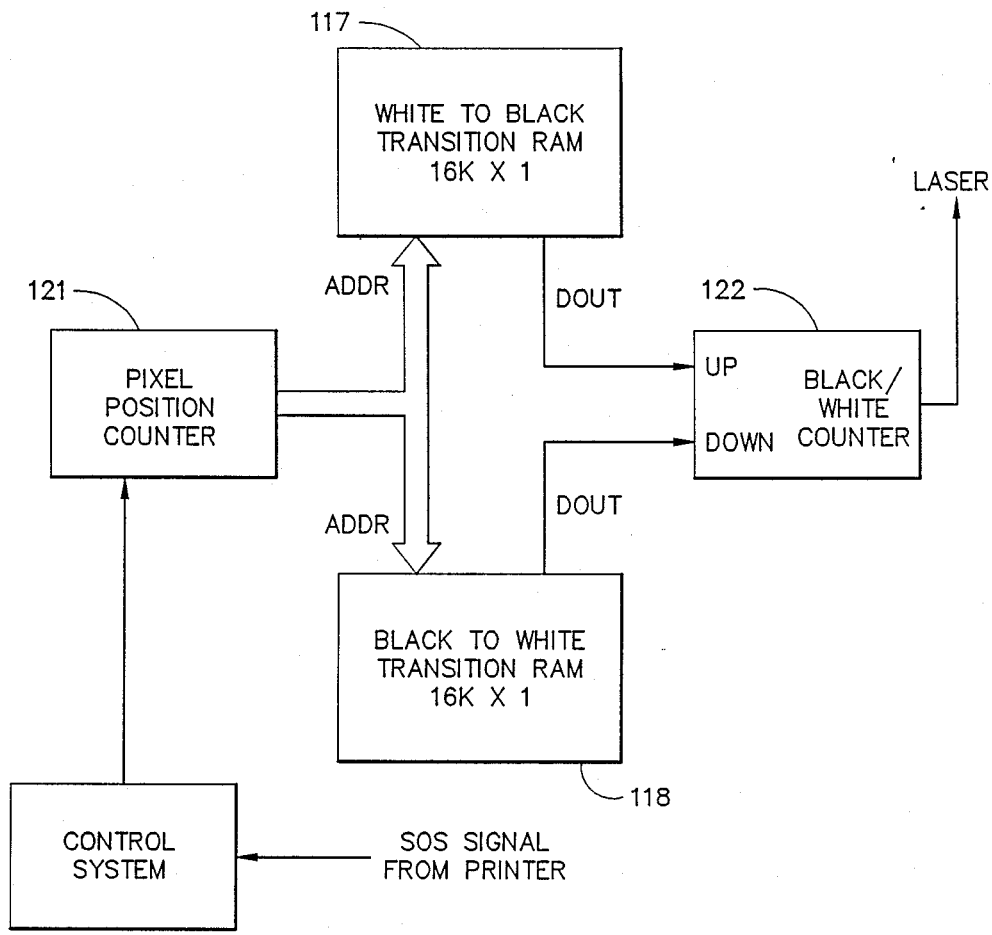
FIG. 4 is an isolated hardware block diagram particularly showing the use of transition-encoded font information to control the white and the black generation of pixels within a scan line, one of many such scan lines which collectively generate a font image.

Not shown in the block diagram of FIG. 4, to avoid complexity, is a further check of the run-length-encoded information received from DYNAMIC MEMORY 320 to look for another unique code (nominally "FE" or "7E"), which indicates that the spacing between successive transitions is too large to be represented in just a single byte. If that is the case, then the HORIZONTAL SUM LATCH 115 sums its old information plus the unique code, but no wiring of that information occurs into the white/black or black/white transition RAMs 117,118, or does the BLACK/WHITE FLIP-FLOP alter its state. The contents of the next location read from the DYNAMIC MEMORY 320 are added in as well, and if this unique code is not again repeated in that location, a transition is recorded.

A detail block diagram of the circuit for generating images from transition-encoded font information is shown in FIG. 4. Each of the WHITE TO BLACK TRANSITION 16K×1 117, and the BLACK TO WHITE TRANSITION 16K×1 118 (both previously seen in FIG. 3) is sized, for example at 16K×1 when there are less than 16K pixels in one scan line, so as to have a one-to-one correspondence between pixels upon the scan line and addressable memory cells within each RAM 117,118. Each RAM 117,118 is initialized, nominally to initially contain all 1's. In the first WHITE TO BLACK TRANSITION 16K×1 117 a flag, nominally a "0", is stored at the point of every transition upon the scan line from white to black. And, in the BLACK TO WHITE TRANSITION 16K×1 118 a flag, nominally a "0" again, is stored at the point of every transition upon the scan line from black to white. These flags, and the addresses within RAMs 117,118 at which they are stored constitute transition-encoded information. This transition-encoded information could have been computed and recorded in any order. The number of bits which are changed is equal to the number of transitions in the scan line (a number which is generally far less than the number of pixels, but which can be as great as the number of pixels).

As previously explained in conjunction with FIG. 3, during the generation (e.g., the printing) of a scan line both RAMs 117,118 are simultaneously read. The PIXEL POSITION COUNTER 121 (previously seen in FIG. 3) supplies the address for both RAMs 117,118, and this counter counts sequentially at the pixel clock rate. Every time the WHITE TO BLACK TRANSITION 16K×1 117 reads a zero output, the BLACK/WHITE COUNTER 122 (previously seen in FIG. 3) is counted in a particular direction, nominally incremented, or "up". Every time the BLACK TO WHITE TRANSITION 16K×1 118 reads a zero output, the same COUNTER 122 is counted in the opposite direction, nominally decremented, or "down". The positive or the negative count of the counter is used to control the black, or the white, generation of successive pixels upon the scan line. The initialized, uncounted, "zero" condition of the counter nominally turns the laser to a condition (which may be either "on" or "off" dependent upon whether a positive or a negative image generation system is being employed) which produces black on the scan line—although even this is a matter of convention determined by the manner in which transition-encoded information is generated from run-length-encoded information. For example, a positive count or a negative count within the BLACK/WHITE COUNTER 122 may respectively control laser beam to be "on" or "off", respectively generating white and black pixels in a positive image-generating system such as a video display unit, or respectively generating black and white pixels in a negative image-generating system such as electrostatic printer wherein the laser beam discharges selected areas of a photoconductive surface.

The addresses supplied by the PIXEL POSITION COUNTER 121 successively index through all locations of WHITE TO BLACK TRANSITION 16K×1 117, and of BLACK TO WHITE TRANSITION 16K×1 118, which locations correspond to real pixel positions upon the scan line. At these successive locations all the white-to-black and black-to-white transitions along the scan line are read. This transition-encoded information is read in parallel to the BLACK/WHITE COUNTER 122, and used to count down and/or count up this COUNTER 122. In the count so obtained, the most significant bit, or sign bit, is used to modulate the marker of the scanning system, or the LASER ON/OFF CONTROL AT THE PRINT ENGINE. The signal PIXEL CLOCK which feeds the PIXEL POSITION COUNTER 122 is a clock which completes one cycle for each and every advancement of the scanning beam by one horizontal pixel in distance. This COUNTER 121 is reset at the beginning of each scan line.

Figure 5:
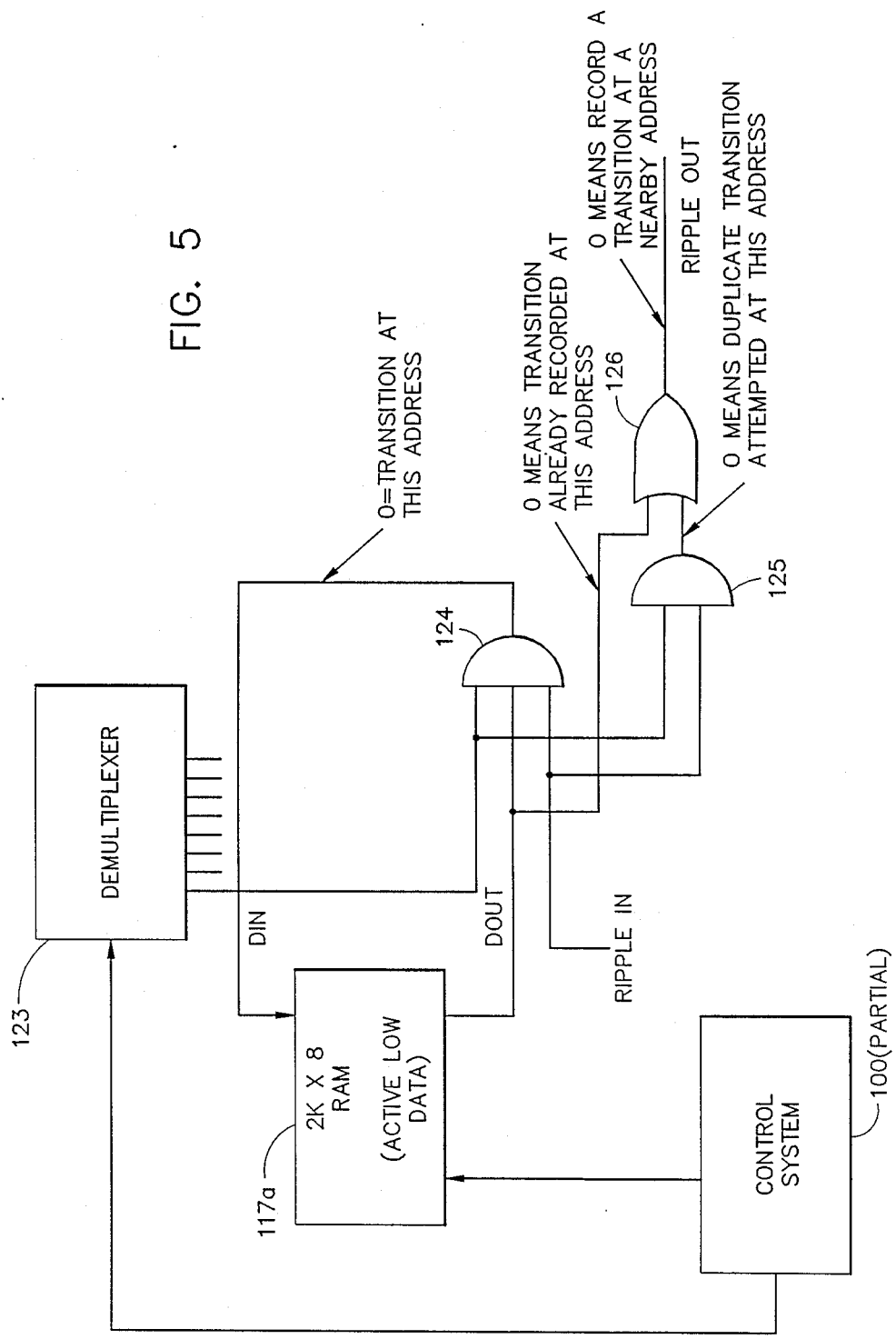
FIG. 5 is an isolated hardware block diagram particularly showing the combination of transition-encoded information in accordance with the present invention in order to generate superimposed font images.

The preferred embodiment of a circuit in accordance with the present invention for implementing the combining of transition-encoded information in order that superimposed font images may be reliably generated is shown in reduced, essential, form in FIG. 5. The function of this circuit will be to detect a situation wherein a transition is attempted to be recorded at an address within the memory (corresponding to a pixel) whereat, because of the previous storage of transition-encoded information of one or more font images, a transition is already stored. Two transitions cannot be stored at the same memory address, but both need to be preserved so that they may be acted upon during image generation to produce the correct composite, superimposed, font images. The circuit functions to move a transition flag (a data bit) which is attempted to be recorded at a memory address (corresponding to a pixel) which already contains a stored transition flag into a nearby memory address (corresponding to a nearby pixel). Moreover, if the nearby memory address (nearby pixel) already happens to have a transition flag recorded there, then the circuit will operate to effect storage of the transition flag in still another nearby address. This combining, or melding, of transition-encoded data transpires in the manner diagrammatically represented in FIG. 6. It ultimately allows that up to 8 transition flags may be simultaneously stored in a one 8-bit memory byte corresponding to 8 contiguous image pixels.

Figure 6:
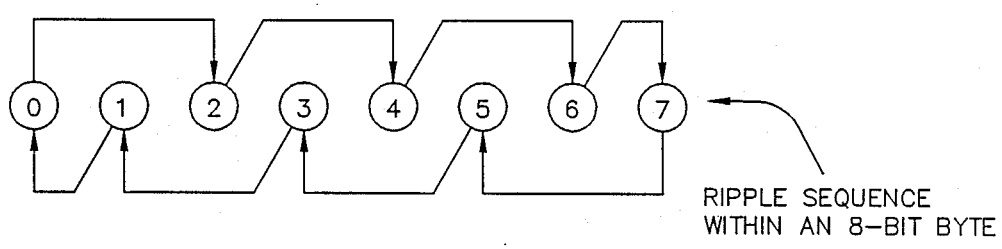
FIG. 6 is a diagrammatic representation showing the rippled positional shifting of transitions within the combined transition-encoded data created in accordance with the present invention.

The operation of the preferred embodiment of a combining circuit in accordance with the present invention which is shown in abbreviated, concise, form in FIG. 6 transpires as follows. Each of the WHITE TO BLACK TRANSITION 16K×1 117, and the BLACK TO WHITE TRANSITION 16K×1 118 (both shown in FIGS. 3 and 4) which are organized as N x 1 stores is replaced with a equivalent memory store organized as N addresses×8 bits. To preserve the exact same number of bit storage locations for storing transition-encoded data as were previously within RAMs 117,118 (shown in FIG. 3 and 4), the replacement RAM for each is sized at 2K×8. One such RAM is illustrated, as exemplary, in FIG. 5 as 2K×8 RAM 117a—implying that it is the counterpart, substitutionary, to the BLACK TO WHITE TRANSITION 16K×1 117 shown in FIGS. 3 and 4. This 2K×8 117a is entered with transition-encoded data, nominally by example the black-to-white transition flags, in the exact same manner as taught within FIG. 3. Consequently, it is so represented in FIG. 5 to be so entered with transition-encoded data by CONTROL SYSTEM 100 (partial), which will be understood to represent the HARDWARE PROCESSOR 100 shown in FIG. 3 minus that small amount of circuitry which is directly represented in FIG. 5, and which is generally considered to itself be within HARDWARE PROCESSOR 100. So far nothing has happened that will not be understood by a practioner of the digital arts to be but a simple substitution of a 2K×8 RAM for a 16K×1 RAM.

The characteristic of the substituted 2K×8 RAM 117a is that in recording each flag (nominally the white-to-black flags by example within this RAM 117a) of transition encoded data at each single pixel at which a flag is to be so recorded than not merely this single pixel address will be read from menory, but rather a total of eight contiguous bits representing eight contiguous pixels will be read in parallel. This is true for each attempted storage of each single flag of transition-encoded information, even though the intent is to store but a single flag.

The manner by which a new flag of transition-encoded information is stored into a previous record of transition-encoded information—a necessary process if the information is to be combined for the generation of superimposed font images—is that the CONTROL SYSTEM 100 (partial) puts the new flag into the DEMULTIPLEXER 123 at a position (actually by a demultiplexer control) which will cause the proper one of eight output lines from this DEMULTIPLEXER 123 to assume the active, logic Low, condition. Meanwhile, the appropriate eight bits of 2K×8 RAM 117a, which also produce a logic Low when active, are caused to be read. The new transition-encoded information flag communicated from the MULTIPLEXER 123 in the logic Low condition will be combined with eight bits of existing transition-encoded information communicated from 2K×8 RAM 117a (also in the logic Low condition for set flags) in discrete logic circuitry of which AND gates 124,125 and OR gate 126 are representative. The combined information developed in this discrete logic circuitry is restored to the 2K×8 RAM 117a. Therein it may be further combined until the entirety of transition-encoded information for any one font image and for all font images, which are to be superimposed has been combined. Thereafter the combined information may be used to control the image generator in accordance with the teaching of FIG. 4. Superimposed font images will be generated by the image generator in equal time, and upon an equal number of scan lines, as if nonsuperimposed font images were being generated.

Before tracing signals used to perform the combining within the discrete logic circuitry, it is useful to refresh one's recollection of just what this combining needs to accomplish. The combining particularly must deal with those one or ones of the plurality of addresses, corresponding to pixels, wherein transitions are encoded in the information for both the first and the second font images (if any such addresses exist). The combining needs to, and will, encode transitions for these one or ones of addresses (pixels) so that the total transitions within the combined font information are preserved. This is accomplished by shifting the position(s) of the transition(s) flag(s) within the second font image information which have identical positional correspondence with transition(s) flag(s) within the first font image information so that the flag(s) are slightly relocated within the combined font image information. This relocation, or shifting, is done in a predetermined ripple sequence only to such extent, and to such displacements, as is (are) necessary. This shifting for combining is performed in a custom logic structure of which AND gates 124,125 and OR gate 126 are illustrative.

Observing FIG. 5, the RIPPLE IN line is usually a logic High, meaning false. A logic Low data bit received at AND gate 124 from the MULTIPLEXER 123, and/or from the 2K×8 RAM 117a (both of which logic Low bits represent transition flags), prevents satisfaction of this AND gate 124 and results in a logic Low, or true, signal D IN which is restored to the 2K×8 RAM 117a as a flag. If a coincidence is seen, meaning that the output data from the 2K×8 RAM 117a is a logic Low and either the corresponding output of DEMULTIPLEXER 123 is also a logic Low, or else the RIPPLE IN line is a logic Low, then by action of AND gate 125 and OR gate 126 the true, logic Low, condition of signal RIPPLE OUT is generated. This signal RIPPLE OUT is fed back as signal RIPPLE IN to a similar circuit for another bit of the 2K×8 RAM 117a. The manner of this RIPPLE SEQUENCE is illustrated in FIG. 6. The coincidental transition-encoded flags thus ripple through as many nearby addresses and corresponding pixel positions as are required until an address (pixel) is found where no transition flag already exists. Therein the ripple-shifted transition flag of the combined transition-encoded data is stored.

The manner of combining transition-encoded font image information for the generation of superimposed font images in accordance with the present invention obviously may occasionally distort the transition boundary of a font image by up to seven pixel positions. At a nominal pixel density of 1200 per inch such occasional distortion is inconsequential, especially if it is recalled that plural font images are not only superimposed, but are exhibiting transition(s) in the region of the distortion. It is also obvious that at congestion levels exceeding eight transitions in as many contiguous pixels the method of the present invention for combining transition-encoded information for the generation of superimposed font images will fail to produce a definitive combination, and resultant image. It is respectfully suggested that if the superimposed images are exceeding eight transitions in 8/1200 of one inch then the image density is too high, and the superimposed combination resembles a mottled gray as opposed to images individually identifiable in their combination.

It should also be understood from the discussion of the present and related inventions that all apparatus and methods regarding the generation, use in imaging, and combination of transition-encoded information are fully applicable to color and multicolor imaging. Particularly as regards the combining in accordance with the present invention the separate transition-encoded data representing primary color font images information might be combined into monochrome font image information.

In accordance with the preceding discussion, certain variations in the method and apparatus in accordance with the present invention will suggest themselves to a practitioner of the art of image generator design. For example, the transition-encoded information need not have been stored within, nor read from, random access memory or memories, but could instead have been located in a serially addressable memory or memories which, while possibly less efficient for the storage of transition-encoded information, would function admirably for image generation from the transition-encoded information stored therein. For example, many of the conventions regarding initialization states, the binary values of flags and/or information, and black/white control should be understood to be arbitrary, and subject to variation while still being within the scope and spirit of the present invention. Accordingly, the present invention should be defined by the scope of the following claims, only, and not solely in accordance with that preferred embodiment within which the present invention has been taught.

What is claimed is:

1. In an image generating apparatus producing a scan line which is controlled to be white or black responsively to transition-encoded font image information within a memory, an improvement according that the transition-encoded information for two font images may be combined, the improvement comprising:
   block reading means for reading at one time from a plurality of memory locations the transition-encoded font image information for a first font, which information corresponds to a like plurality of pixels in the first font image;
   encoding means for producing the transition-encoded font image information for a second font, which information corresponds to at least one pixel of the plurality of pixels;
   combining means for combining the transition-encoded font image information for the first font with the transition-encoded font image information for the second font into a combined font image information so that for any pixels wherein a transition is encoded in both the encoded font image information for both the first font and also for the second font then the combined font image information will likewise encode a transition at these pixels and will also encode a transition at selected nearby pixels, the total transitions within the combined font image information preserving the numbers of transitions which are within the font image information for the first font and within the font image information for the second font; and
   means for restoring the combined font image information to the memory.

2. A memory performed in an image generating apparatus which traces out pixels upon scan line to be either white or black in accordance with black/white transition data recorded in a memory which has addresses corresponding to the scan line pixels, the method comprising:
   melding transition data for a first font with sameformat transition data for a second font into melded transition data so that (i) a maximum of one black/white transition is represented in each portion of the melded transition that corresponds to one scan line pixel, while (ii) all transitions that are within the first-font transition data and that are within the second-font transition data are preserved in the melded transition data;
   storing the melded transition data in a memory which has addresses corresponding to pixels upon a scan line; and
   tracing out a scan line to be either white or black in accordance with the melded transition data stored within the memory.

3. The method according to claim 2 wherein the melding of first-font transition data and of second-font transition data further comprises:
   first preserving at each pixel of the transition data all transitions occurring with a corresponding pixel of one only of the first-font transition data and the second-font transition data, and
   second preserving at each pixel, plus also at a nearby pixel, of the melded transition data any two transitions occurring within a corresponding pixel of both the first-font transition data and the second-font transition data.

4. A method performed in an image generating apparatus which traces out pixels upon scan line to be either white or black in accordance with black/white transition data recorded in a memory which has addresses corresponding to the scan line pixels, the method comprising:
   melding transition data for a first font with same-format transition data for a second font into melded transition data so that (i) a maximum of one black/white transition is represented in each portion of the melded transition that corresponds to one scan line pixel, while (ii) all transitions that are within the firstfont transition data and that are within the second-font transition data are preserved in the melded transition data by a process comprising:

first preserving at each pixel of the transition data all transitions occurring within a corresponding pixel of one only of the first-font transition data and the second-font transition data, and second preserving at each pixel, plus also at a nearby pixel, of the melded transition data any two transitions occurring within a corresponding pixel of both the first-font transition data by locating the nearby pixels as ones whereat a transition occurs within neither the first-font transition data nor within the second-font transition data.

5. The method according to claim 4 wherein the locating further comprises:

ripple sequencing in fixed order through the pixels whereat transitions occur within one or both of the first-font transition data and the second-font transition data until a first pixel is identified whereat a transition occurs within neither the first-font transition data nor within the second-font transition data.

6. The method according to claim 5 wherein the ripple sequencing is in a fixed order through eight contiguous pixels.

7. The method according to claim 6 wherein the ripple sequencing in fixed order through eight contiguous pixels commences with the second next adjacent pixel, pixel 2, to that pixel, pixel 0, whereat transitions occur within both the first-font transition data and within the second-pixel transition data.

8. The method according to claim 7 wherein the ripple sequencing proceeds fron pixel 2 in order to pixels, 4, 6, 7, 5, 3 and 1.

9. To a method, performed in an image generating device, including the steps of storing transition data in a memory having addresses corresponding to pixels across a scan line, and controlling, responsive to transition data read from the memory pixels across a scan line to be white or black in generation of an image;

an improvement to said storing according that the transition data is combinatorially of two font images and that consequently the white/black scan line pixel controlling is for generation of the image of two superimposed fonts, the improvement comprising:

combining transition data for a first font with transition data for a second font so that (i) one only transition is within a particular data point of the transition data and (ii) no transitions are lost in and by the combining; and storing one transition data point per address, the combined transition data in a memory occupying a range of addresses corresponding to pixels across a scan line.

10. The method according to claim 9 wherein the combining transition data comprises:

first recording, for all data points whereat only the first font transition data or the second font transition data records a transition, a transition at the corresponding data points of the combined fonts transition data;

second recording, for all data points whereat both the first font transition data and the second font transition data record a transition, a transition at the corresponding data points of the combined fonts transition data plus other, additional, transitions at nearby data points of the combined fonts transition data, whereat and wherein for each of these nearby data points neither the first font transition data nor the second font transition data records a transition; and third recording, for all data points (i) whereat neither the first font transition data nor the second font transition data records a transition and (ii) which data points are not nearby data points, no transition at the corresponding data points of the combined fonts transition data.

11. The method according to claim 10 wherein the first recording, second recording, and third recording are successively performed upon successive corresponding pluralities of data points from the first font transition data and from the second font transition data in order to produce, upon each of a succession of combinings, a corresponding plurality of data points within the combined fonts transition data.

12. The method according to claim 11 wherein the second recording successively performed upon corresponding pluralities of data points from the first font transition data and from the second font transition data uses, at each of these successive second recordings, nearby data points that are within the plurality of data points being dealt with in that second recording.

13. To a method performed in an image generating device, including the steps of storing transition data in a memory having addresses corresponding to pixels across a scan line, and controlling, responsive to transition data read from the memory pixels across a scan line to be white or black in generation of an image; an improvement to said storing according that the transition data is combinatorially of two font images and that consequently the white/black scan line pixel controlling is for generation for the image of two superimposed fonts, the improvement comprising:

combining transition data for a first font with transition data for a second font so that (i) one only transition is within a particular data point of the transition data and (ii) no transitions are lost in and by the combining by a process comprising:

first recording, for all data points whereat only the first font transition data or the second font transition data records a transition, a transition at the corresponding data points of the combined fonts transition data;

second recording, for all data points whereat both the first font transition data and the second font transition data record a transition, a transition at the corresponding data points of the combined fonts transition data plus other, additional, transitions at nearby data points of the combined fonts transition data, whereat and wherein for each of these nearby data points neither the first font transition data nor the second font transition data records a transition; and third recording, for all data points (i) whereat neither the first font transition data nor the second font transition data records a transition and (ii) which data points are not nearby data points, no transition at the corresponding data points of the combined fonts transition data; and storing one transition data point per address, the combined transition data in a memory occupying a range of addresses corresponding to pixels across a scan line;

wherein the second recording successively performed upon corresponding pluralities of data points from the first font transition data and from the second font transition data uses, at each of these successive second recordings, nearby data points that are within the plurality of data points being dealt with in that second recording;

wherein the using of nearby data points within the plurality of data points is by a rippled sequence, each data point whereat both the first font transition data and the second font transition data record a transition resulting in a using of a predetermined nearby data point.

14. The method according to claim 13 wherein the rippled sequence using of a predetermined nearby data point initially attempts using the second adjacent data point as the predetermined nearby data point.

15. The method to claim 14 wherein each plurality of data points is eight in number and wherein use of nearby data points proceeds in the rippled sequence 0 (initial point) to 2 to 4 to 6 to 7 to 5 to 3 to 1.

16. A circuit apparatus, part of an image generator using transition-encoded data stored within a memory in the generation of font images, for melding transition-encoded data representing a first font image and transitionencoded data representing a second font image into a composite transition-encoded data (i) representing both the first and the second font image in superimposed relation, and (ii) from which the superimposed first and second font images may be concurrently generated by the image generator, the circuit apparatus for melding transition-encoded data comprising:

a memory for reading the transition-encoded data representing a first font image;

a hardware processor for generating the transitionencoded data representing a second font image which is to be imaged at least partially superimposed within the first font image;

comparison means, receiving a plurality of bits of the second font image data from the hardware processor, for melding the data into a data so that (i) a maximum of one transition is represented of each bit, corresponding to one pixel, of the composite data while (ii) all transitions represented within the first font image data or within the second font image data or within both the first font image data and the second font image data are preserved in the composite data.

17. The circuit apparatus for melding transitionencoded data according to claim 16 wherein the comparison means comprise:

first gating means for producing a transition at a bit of the composite data where a corresponding bit of the data representing one or both of the first and the second font image exhibits a transition.

18. The circuit apparatus for melding tranition-encoded data according to claim 17 wherein the comparison means further comprises:

second gating means for determining when a bit of the data representing the second font image exhibits a transition simultaneously that corresponding bit of the data representing the first font image also exhibits a transition, and producing in this case a ripple output signal.

19. A circuit apparatus, part of an image generator using transition-encoded data stored within a memory in the generation of font images, for melding transition-encoded data representing a first font image and a transition-encoded data representing a second font image into a composite transitionencoded data (i) representing both the first and the second font image in superimposed relation, and (ii) from which the superimposed first and second font images may be concurrently generated by the image generator, the circuit apparatus for melding transition-encoded data comprising:

a memory for reading the transition-encoded data representing a first font image;

a hardware processor for generating the transitionencoded data representing a second font image which is to be imaged at least partially superimposed with the first font image;

comparison means, receiving a plurality of bits of the second font image data from the hardware processor, for melding the data into composite data so that (i) a maximum of one transition is represented at each bit, corresponding to one pixel, of the composite data while (ii) all transitions represented within the first font image data or within the second font image data or within both the first font image data and the second font image data are preserved in the composite data, the comparison means comprising:

first gating means for producing a transition at a bit of the composite data where a corresponding bit of the data representing one or both of the first and the second font image exhibits a transition; and second gating means for determining when a bit of the data representing the second font image exhibits a transition simultaneously that corresponding bit of the data representing the first font image also exhibits a transition, and producing in this case a ripple output signal;

wherein the first gating means is further producing a transition at the bit of the composite data upon such times as the ripple output signal corresponding to this bit is received resultantly from determining by the second gating means of a different, related, bit.

20. The circuit apparatus for melding transitionencoded data according to claim 19 wherein the ripple output signal from the second gating means of each bit is communicated to the first gating means of a related bit in a ripple sequenced manner, meaning that the ripple output signal corresponding to bit 0 is communicated to the first gating means of bit 2, bit 2 ripple output signal is communicated to bit 4, 4 to 6, 6 to 7, 7 to 5, 5 to 3, 3 to 1, and 1 to the first gating means corresponding to bit 0;

wherein the melding is by 8-bit bytes of data representing the first and the second font images.

* * * * *